US008033707B2

(12) United States Patent
Kim et al.

(10) Patent No.: US 8,033,707 B2
(45) Date of Patent: Oct. 11, 2011

(54) LED BACKLIGHT ASSEMBLY HAVING LOWER BRIGHTNESS LEDS AT ENDS

(75) Inventors: Hanhee Kim, Gumi-si (KR); Wontaek Moon, Kyungbuk (KR); Wook Jeon, Daejeon (KR); Jaewon Shin, Busan (KR); Junho Bae, Kyungbuk (KR)

(73) Assignee: LG Display Co., Ltd., Seoul (KR)

( * ) Notice: Subject to any disclaimer, the term of this patent is extended or adjusted under 35 U.S.C. 154(b) by 116 days.

(21) Appl. No.: 12/289,027

(22) Filed: Oct. 17, 2008

(65) Prior Publication Data

US 2009/0129117 A1   May 21, 2009

(30) Foreign Application Priority Data

Oct. 23, 2007  (KR) .................. 10-2007-0106636

(51) Int. Cl.
*G02F 1/13357* (2006.01)
*F21V 7/04* (2006.01)

(52) U.S. Cl. ........ 362/612; 362/613; 362/608; 362/621; 349/65; 349/68

(58) Field of Classification Search .............. 362/601, 362/612, 608, 621, 622, 230, 249.02, 249.06, 362/293; 349/65, 68, 71
See application file for complete search history.

(56) References Cited

U.S. PATENT DOCUMENTS

| | | | | |
|---|---|---|---|---|
| 4,992,704 A | * | 2/1991 | Stinson | 315/312 |
| 5,420,482 A | * | 5/1995 | Phares | 315/292 |
| 5,813,752 A | * | 9/1998 | Singer et al. | 362/293 |
| 5,847,507 A | * | 12/1998 | Butterworth et al. | 313/512 |
| 6,252,254 B1 | * | 6/2001 | Soules et al. | 257/89 |
| 6,508,564 B1 | * | 1/2003 | Kuwabara et al. | 362/612 |
| 6,586,874 B1 | * | 7/2003 | Komoto et al. | 313/503 |
| 6,777,891 B2 | * | 8/2004 | Lys et al. | 315/291 |
| 6,829,852 B1 | * | 12/2004 | Uehran | 40/451 |
| 6,923,548 B2 | * | 8/2005 | Lim | 362/612 |
| 7,026,756 B2 | * | 4/2006 | Shimizu et al. | 313/503 |
| 7,220,039 B2 | * | 5/2007 | Ahn et al. | 362/612 |
| 2006/0002146 A1 | | 1/2006 | Baba | |
| 2007/0012940 A1 | | 1/2007 | Suh et al. | |
| 2007/0099319 A1 | | 5/2007 | Tran et al. | |
| 2007/0115648 A1 | | 5/2007 | Huang | |
| 2007/0189037 A1 | | 8/2007 | Ahn et al. | |

FOREIGN PATENT DOCUMENTS

| | | |
|---|---|---|
| CN | 1490650 | 4/2004 |
| CN | 1716042 | 1/2006 |
| EP | 1 594 172 A2 | 11/2005 |
| GB | 2393845 A | 4/2004 |
| JP | 2002-109936 | 4/2002 |

(Continued)

*Primary Examiner* — Ismael Negron
(74) *Attorney, Agent, or Firm* — McKenna Long & Aldridge, LLP.

(57) ABSTRACT

A LED backlight assembly including a light emitting diode array having a plurality of red, green and blue light emitting diodes; a light guide plate at the side of the light emitting diode array; and a supporter supporting the light guide plate. The amount of red light produced by a red light emitting diode positioned at one end of the light emitting diode array and the amount of blue light produced by a blue light emitting diode positioned at another end of the light emitting diode array is less than that produced by the next light emitting diode of the same color, respectively.

5 Claims, 7 Drawing Sheets

FOREIGN PATENT DOCUMENTS

| | | | |
|---|---|---|---|
| JP | 2002109936 A * | 4/2002 | |
| WO | WO 2006/104319 A1 | 10/2006 | |
| WO | WO 2007/107896 | 9/2007 | |
| WO | WO 2008/007347 A2 | 1/2008 | |

* cited by examiner

Not seen red light

Seen red light

LED BACKLIGHT ASSEMBLY HAVING LOWER BRIGHTNESS LEDS AT ENDS

This application claims the benefit of Korea Patent Application No. 10-2007-0106636 filed on Oct. 23, 2007, which is incorporated herein by reference for all purposes as if fully set forth herein.

BACKGROUND OF THE INVENTION

1. Field of the Invention

The present invention relates to a backlight assembly for emitting light to a flat panel display device.

2. Discussion of the Related Art

Out of flat panel display devices, a liquid crystal display controls a molecular arrangement of a liquid crystal layer having an anisotropic dielectric constant and controls the amount of light transmitted by the liquid crystal layer, thereby displaying an image.

Because the liquid crystal display is a light receiving type display device, the liquid crystal display requires a backlight assembly producing light to display the image. The backlight assembly includes a light source producing light. Examples of the light source include a cold cathode fluorescent lamp (CCFL), an exterior electrode fluorescent lamp (EEFL), and a light emitting diode (LED).

In case the backlight assembly includes the light emitting diode as the light source, red, green, and blue light emitting diodes are together used to produce white light. Red, green, and blue light are three primary colors of light and are together mixed to produce white light. As described above, because the light emitting diode uses the three primary colors of light, a representable range of colors is wide.

For instance, a 3-color light emitting diode constitutes a light emitting diode array in which red, green, and blue light emitting diodes are arranged in the order named. The red and blue light emitting diodes are positioned at the beginning and the end of the light emitting diode array, respectively, and thus the amount of red light and the amount of blue light at the beginning and the end of the light emitting diode array are relatively more than the amount of the other light. As a result, because red, green, and blue light are not uniformly mixed at the beginning and the end of the light emitting diode array, white light, to which red or blue light is added, is emitted at both ends of a liquid crystal panel. Hence, color uniformity of the liquid crystal panel is reduced.

SUMMARY OF THE INVENTION

Accordingly, the present invention is directed to a backlight assembly that substantially obviates one or more of the problems due to limitations and disadvantages of the related art.

An advantage of the present invention is to provide a backlight assembly capable of producing uniform white light over the entire area when a light emitting diode is used as a light source.

Additional features and advantages of the exemplary embodiments of the invention will be set forth in the description which follows, and in part will be apparent from the description, or may be learned by practice of the exemplary embodiments of the invention. The objectives and other advantages of the exemplary embodiments of the invention will be realized and attained by the structure particularly pointed out in the written description and claims hereof as well as the appended drawings.

To achieve these and other advantages and in accordance with the purpose of the present invention, as embodied and broadly described, a backlight assembly includes a light emitting diode array including a plurality of light emitting diodes, a light guide plate at the side of the light emitting diode array, and a supporter supporting the light guide plate, wherein light produced by the light emitting diodes positioned at both ends of the light emitting diode array that is incident on the light guide plate is darker than light produced by the other light emitting diodes that is incident on the light guide plate.

In another aspect of the present invention, a backlight assembly includes a light emitting diode array including a plurality of light emitting diodes, a light guide plate at the side of the light emitting diode array, and an optical sheet diffusing light emitted from the light guide plate, wherein white light emitting diodes producing white light are positioned at both ends of the light emitting diode array, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the invention examples of which are illustrated in the accompanying drawings.

Figure 1:
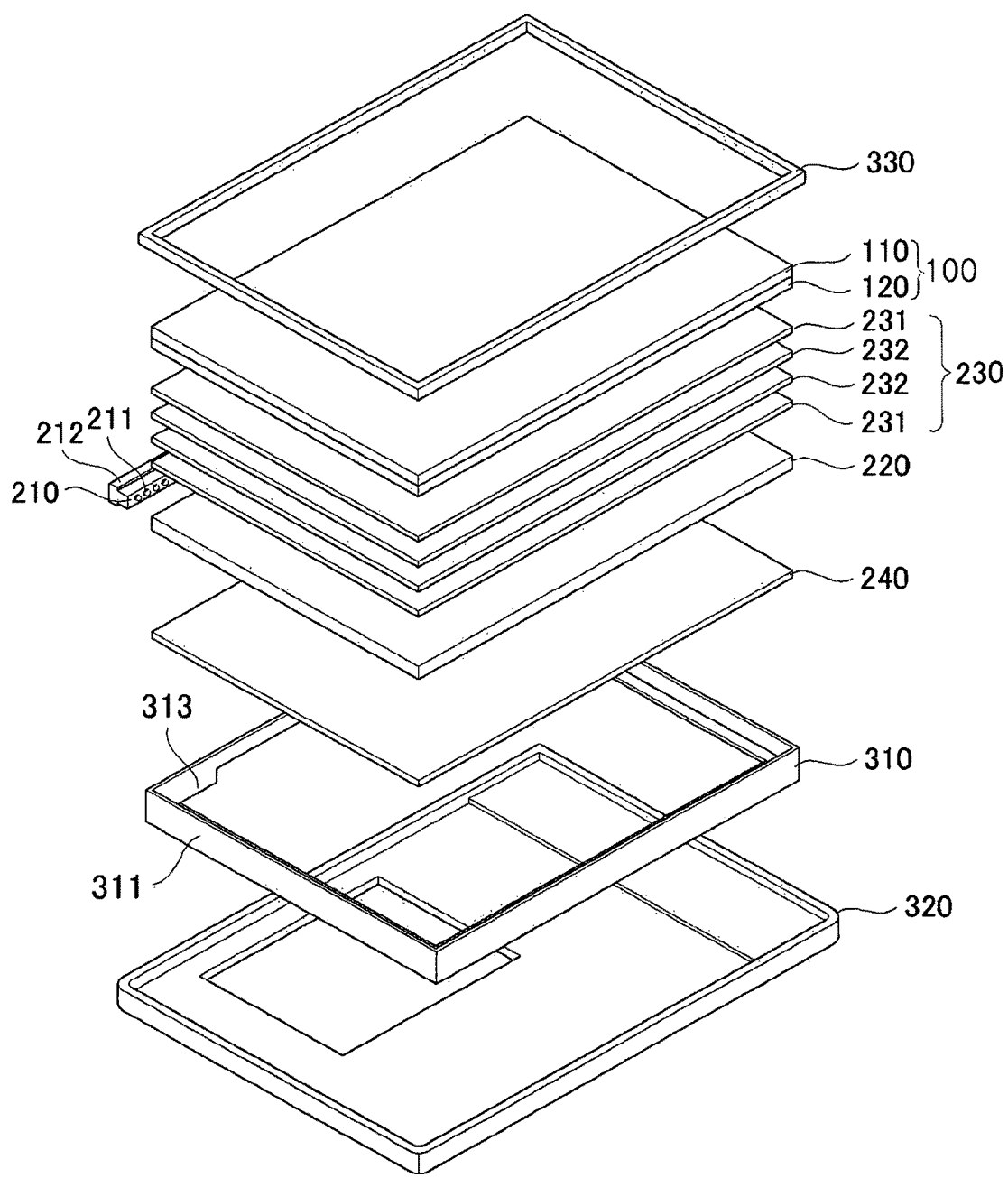
FIG. 1 is an exploded perspective view of a flat panel display device according to a first exemplary embodiment of the invention.

FIG. 1 is an exploded perspective view of a liquid crystal display according to a first exemplary embodiment of the invention.

As shown in FIG. 1, the liquid crystal display according to the first exemplary embodiment of the invention includes a liquid crystal panel 100, a backlight assembly under the liquid crystal panel 100, and a bottom cover 320 and a top cover 330 that are used to package the liquid crystal panel 100 and the backlight assembly.

The liquid crystal panel 100 includes an upper substrate 110 and a lower substrate 120 that face each other and are attached to each other while being spaced apart from each other at a uniform cell gap therebetween, and a liquid crystal layer (not shown) between the upper and lower substrates 110 and 120.

The backlight assembly under the liquid crystal panel 100 provides light to the liquid crystal panel 100. The backlight assembly includes a light emitting diode array 210 producing light. The backlight assembly may further include a light guide plate 220, an optical sheet 230, and a reflective sheet 240.

The light emitting diode array 210 is positioned parallel to the side of the light guide plate 220. The light emitting diode array 210 includes a light emitting diode 211 and a housing 212 for fixing the light emitting diode 211.

Figure 8:
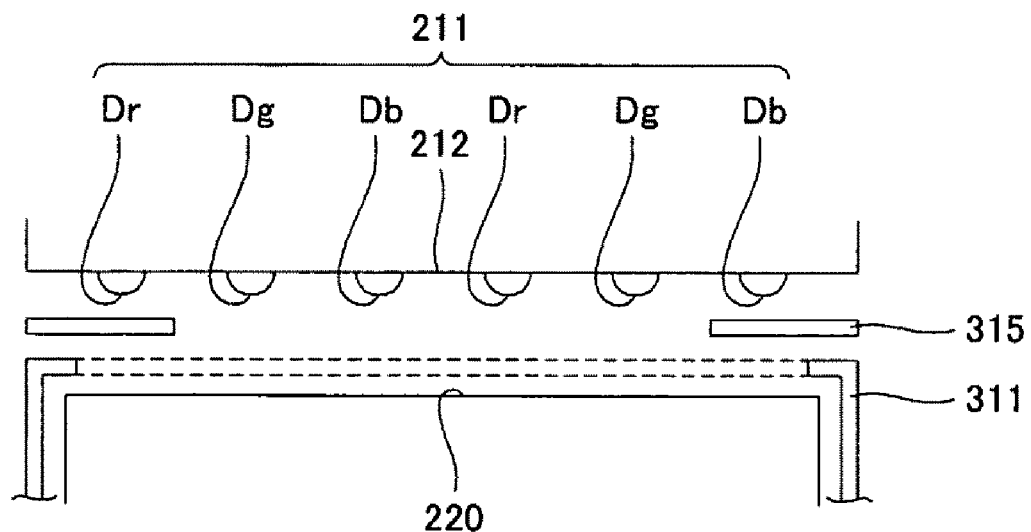
FIG. 8 is a schematic plane view showing the location relationship between the shielding unit, the supporter, and the light emitting diode array.

The light emitting diode 211 may include a red light emitting diode Dr, a green light emitting diode Dg, and a blue light emitting diode Db producing red light, green light, and blue light, respectively as shown in FIG. 8.

The red light emitting diode Dr, the green light emitting diode Dg, and the blue light emitting diode Db of the light emitting diode 211 may be aligned at the side of the light guide plate 220 in a row in the other named.

The light emitting diode 211 emits red, green, and blue light at the side of the light guide plate 220 and provides the red, green, and blue light to the light guide plate 220. The light emitting diode 211 changes the red, green, and blue light into uniform white light to supply the uniform white light to the liquid crystal panel 100.

The light guide plate 220 is positioned at the side of the light emitting diode array 210 on the same plane with the light emitting diode array 210, and is interposed between the optical sheet 230 and the reflective sheet 240. The light guide plate 220 guides light produced by the light emitting diode array 210 to provide the white light to the liquid crystal panel 100.

The reflective sheet 240 is positioned under the light guide plate 220 and reflects light toward the light guide plate 220. The reflective sheet 240 reflects light, which is produced by the light emitting diode array 210 and travels sideward or downward, thereby reducing the loss of light and improving the uniformity of light transmitted by the light guide plate 220.

The optical sheet 230 prevents image sticking from appearing on the liquid crystal panel 100 and provides light with the uniform brightness to the liquid crystal panel 100. The optical sheet 230 may include several diffusion sheets 231 and several prism sheets 232 so as to increase a scattering effect of light produced by the light emitting diode array 210.

Figure 2:
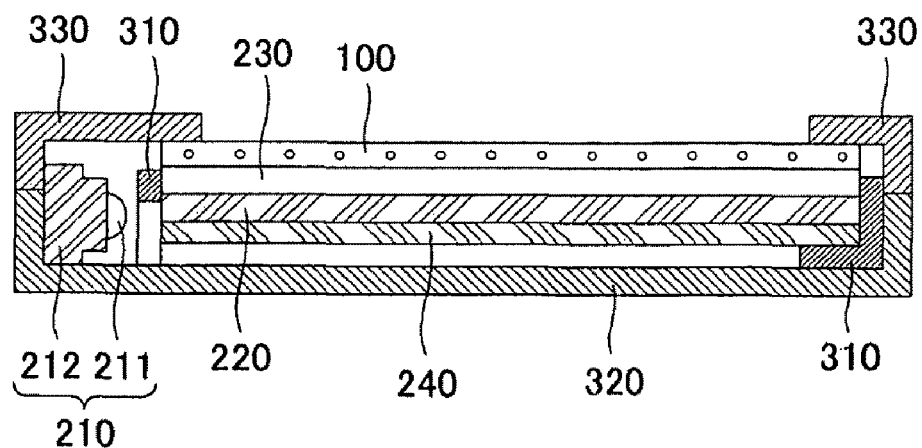
FIG. 2 is a cross-sectional view of a flat panel display device according to a first exemplary embodiment of the invention.
Figure 3:
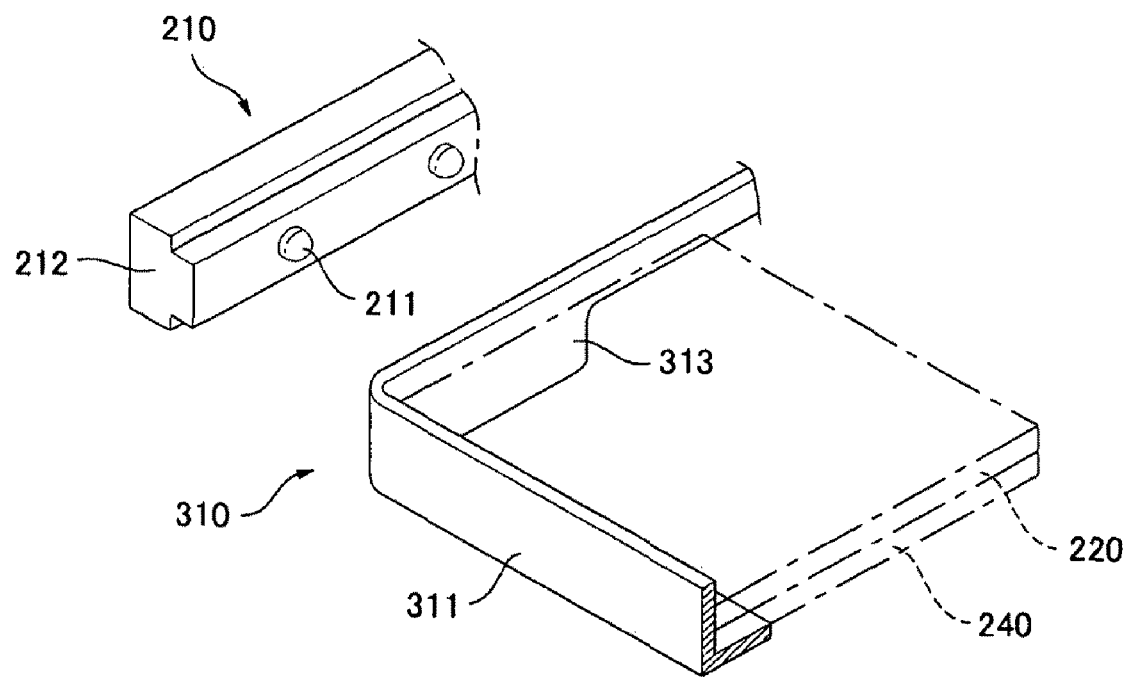
FIG. 3 is a partial exploded perspective view showing a location relationship between a light emitting diode array and a supporter.

FIG. 2 is a cross-sectional view of a flat panel display device according to a first exemplary embodiment of the invention. FIG. 3 is a partial exploded perspective view for explaining an assembly relationship between the light emitting diode array 210 and a supporter 310.

As shown in FIGS. 2 and 3, the light guide plate 220, the optical sheet 230, and the reflective sheet 240 are combined by the supporter 310 and are fixed on the bottom of the bottom cover 320. The supporter 310 surrounds edges of the light guide plate 220, the optical sheet 230, and the reflective sheet 240. The light emitting diode array 210 is fixed on the bottom of the bottom cover 320 at the side of the light guide plate 220. Accordingly, light produced by the light emitting diode array 210 passes though the supporter 310 and travels to the light guide plate 220.

In the first exemplary embodiment, the supporter 310 includes a frame 311 for fixing the light guide plate 220 and a shielding unit 313 facing the light emitting diode 211. The shielding unit 313 may be configured by a portion of the frame 311. This will be described in detail with reference to FIG. 3.

In FIG. 3, the frame 311 constitutes a rectangular frame suitable for a shape of the light guide plate 220. A thickness of the frame portion 311 facing the light emitting diode 211 is smaller than thicknesses of the other portions, and thus light produced by the light emitting diode 211 is directly incident on the light guide plate 220.

In the first exemplary embodiment, the shielding unit 313 faces the light emitting diodes 211 positioned at the beginning and the end of the light emitting diode array 210. For example, if the red light emitting diode Dr, the green light emitting diode Dg, and the blue light emitting diode Db of the light emitting diode 211 are aligned in the other named, the shielding unit 313 faces the red and blue light emitting diodes Dr and Db positioned at the beginning and the end of the light emitting diode array 210.

Figure 4:
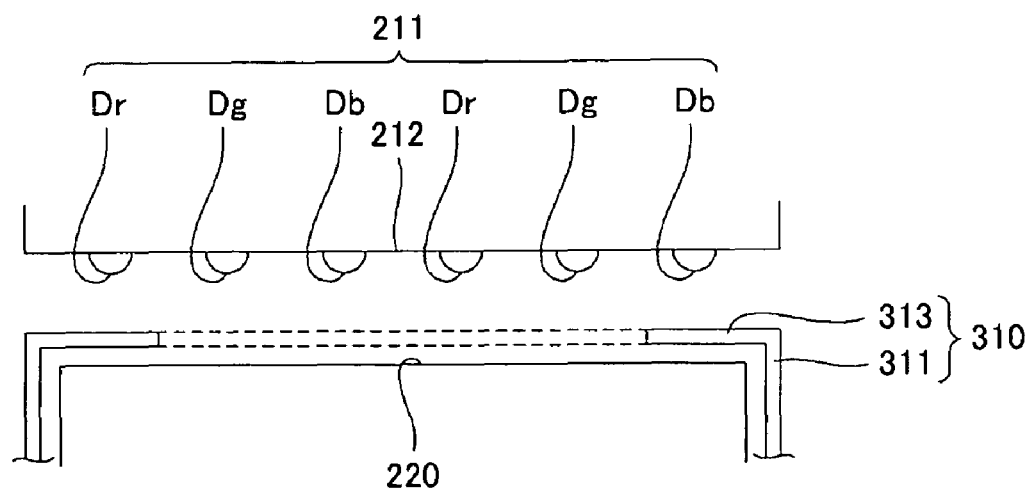
FIG. 4 is a schematic plane view showing the location relationship between the light emitting diode array and the supporter.

FIG. 3 shows that the shielding unit 313 faces the red light emitting diode Dr positioned at the beginning of the light emitting diode array 210. FIG. 4 is a plane view showing a location of the shielding unit 313.

In FIGS. 3 and 4, a portion of the frame 311 constitutes the shielding unit 313, and the frame 311 and the shielding unit 313 have an equal height. Because the shielding unit 313 faces the red light emitting diode Dr, red light produced by the red light emitting diode Dr is not directly incident on the light guide plate 220 and is partially shielded by the shielding unit 313. Hence, the amount of red light is less than the amount of green or blue light at an edge portion of the light guide plate 220 facing the red light emitting diode Dr, and thus a phenomenon in which red runs on the liquid crystal panel 100 facing the light guide plate 220 can be prevented.

Figure 5:
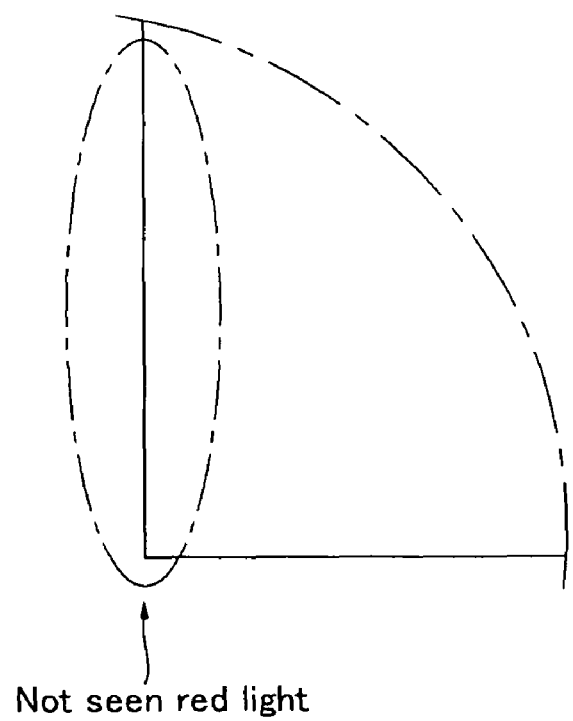
FIG. 5 is a photograph showing the light emission of the liquid crystal panel according to the first exemplary embodiment of the invention.
Figure 6:
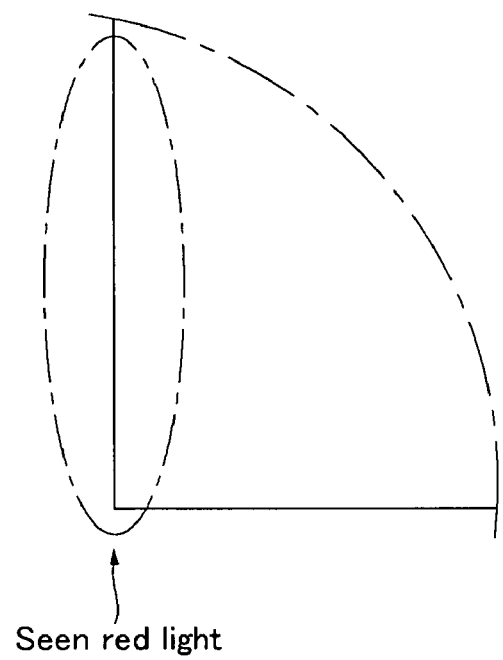
FIG. 6 is a photograph showing the light emission of a related art liquid crystal panel.

FIG. 5 is a light emitting photograph of the liquid crystal panel including the shielding unit, and FIG. 6 is a light emitting photograph of a related art liquid crystal panel not including the shielding unit. As can be seen from FIGS. 5 and 6, red light is mixed with white light in an edge portion of the related art liquid crystal panel in FIG. 6, but the red light running phenomenon does not occur at an edge portion of the liquid crystal panel in FIG. 5.

Figure 7:
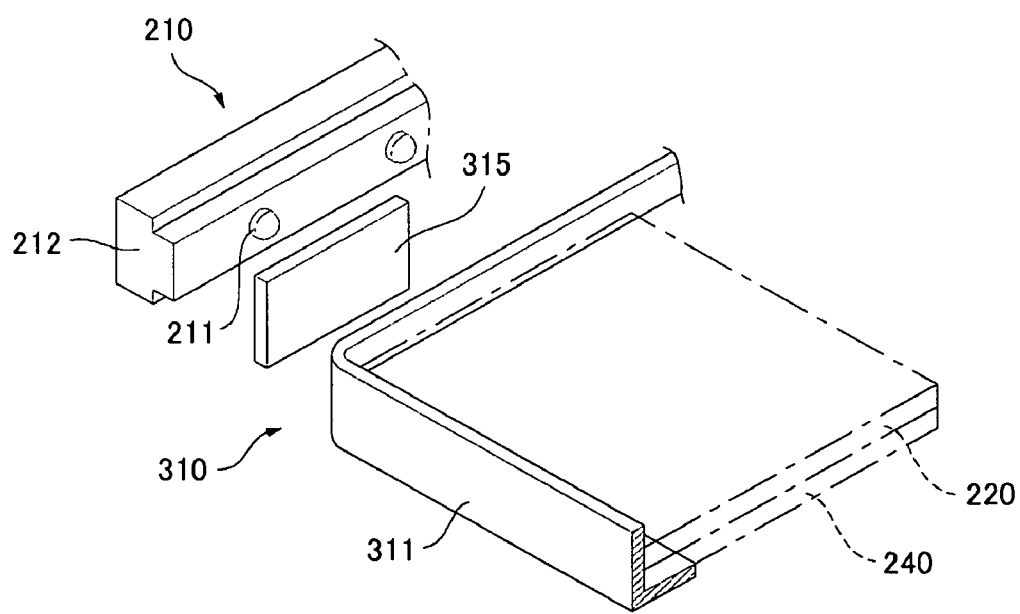
FIG. 7 is a partial exploded perspective view showing that a shielding unit is separated from the supporter.

FIGS. 7 and 8 show that the shielding unit 313 is not configured by a portion of the frame 311 of the supporter 310 and is separately formed. In other words, a shielding unit 315 is formed separately from the frame 311.

Figure 9:
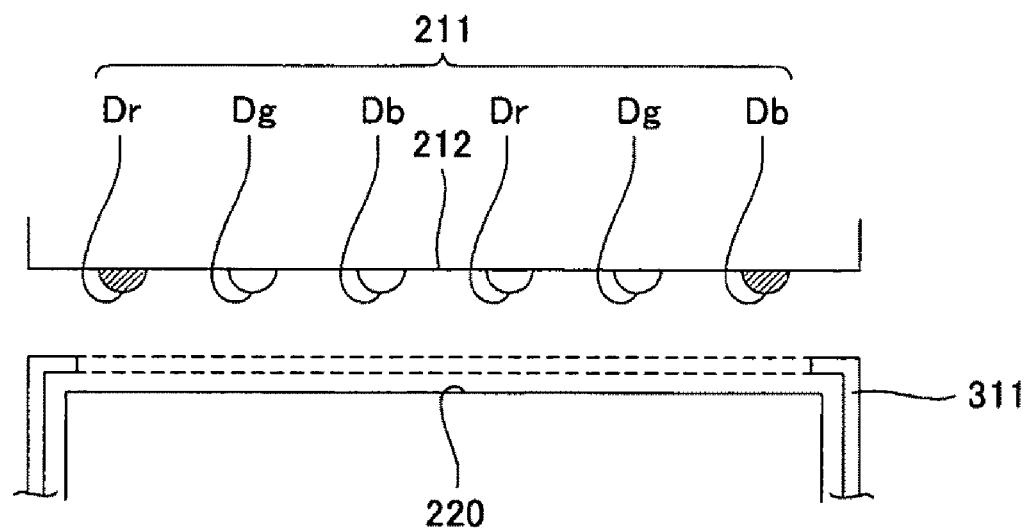
FIG. 9 is a schematic plane view showing a location relationship between a light emitting diode array and a supporter according to a second exemplary embodiment of the invention.

FIG. 9 shows a backlight assembly according to a second exemplary embodiment of the invention. Configurations of a light emitting diode array 210 and a supporter 310 in the second exemplary embodiment are different from the configurations of the light emitting diode 210 and the supporter 310 in the first exemplary embodiment.

In the second exemplary embodiment, the supporter 310 does not include the shielding unit. Because there is no shielding unit between a light emitting diode 211 and a light guide plate 220, light produced by the light emitting diode array 210 is directly incident on the light guide plate 220.

A red light emitting diode Dr, a green light emitting diode Dg, and a blue light emitting diode Db of the light emitting diode 210 may be aligned in the other named. Hence, the red light emitting diode Dr and the blue light emitting diode Db are positioned at the beginning and the end of the light emitting diode 210, respectively.

The external surface of the red light emitting diode Dr and the external surface of the blue light emitting diode Db are haze-processed. Accordingly, because red, green, and blue light is mixed with each other in a state where the amount of red light is reduced, a red or blue light running phenomenon at an edge portion of a liquid crystal panel can be prevented.

Figure 10:
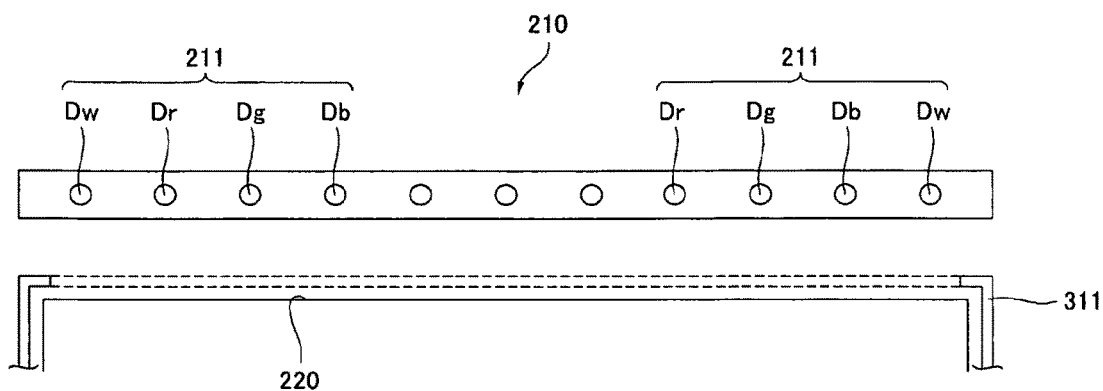
FIG. 10 is a schematic plane view showing a location relationship between a light emitting diode array and a supporter according to a third exemplary embodiment of the invention.
Figure 11:
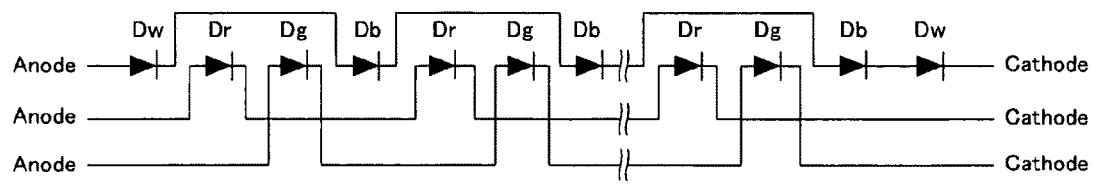
FIG. 11 shows an electrical connection of a light emitting diode depending on color.
Figure 12:
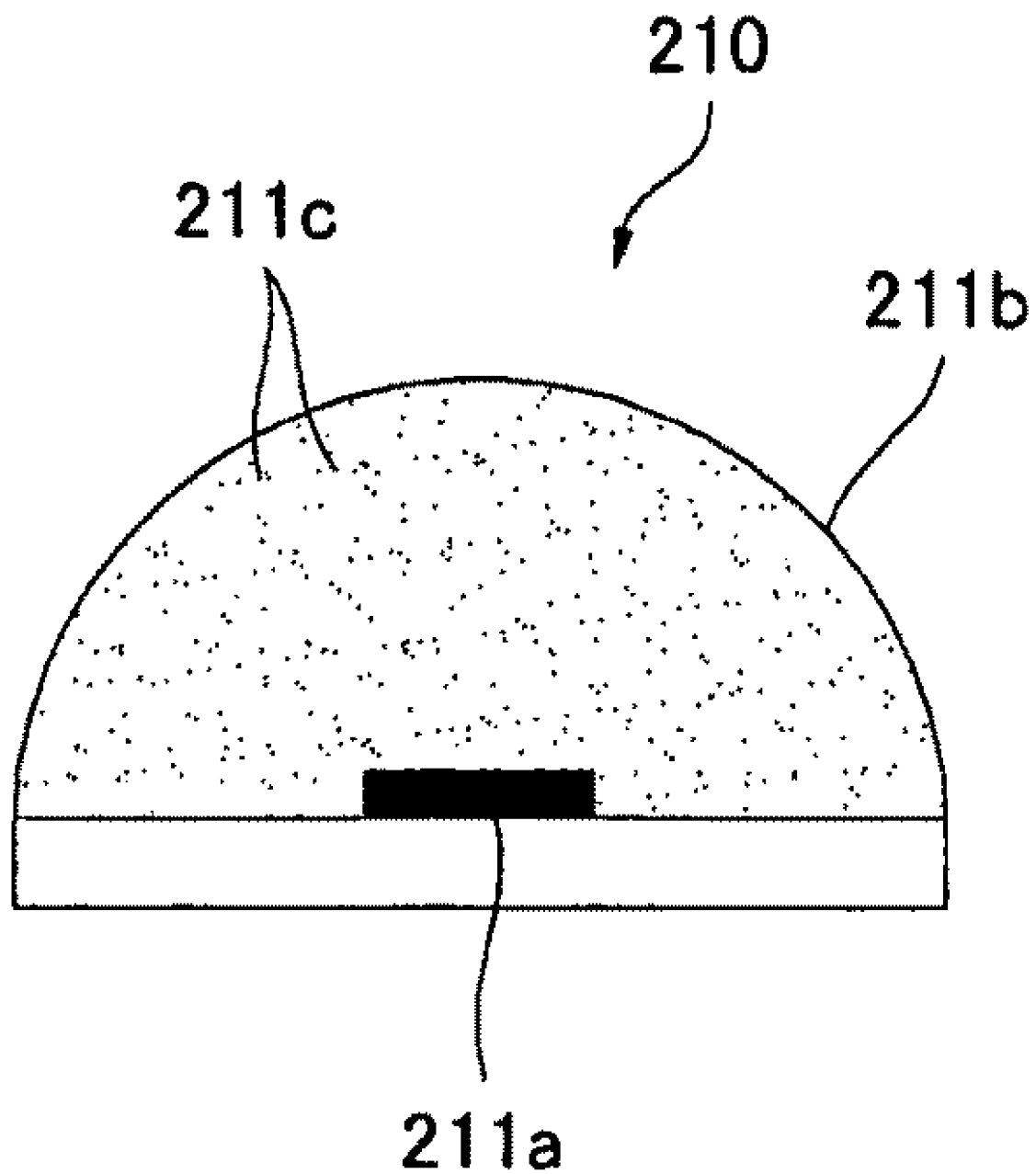
FIG. 12 is a cross-sectional view of a white light emitting diode.

FIGS. 10 to 12 show a backlight assembly according to a third exemplary embodiment of the invention.

FIG. 10 is a schematic plane view showing a location relationship between a light emitting diode array 210 and a light guide plate 220 according to a third exemplary embodiment of the invention.

As shown in FIG. 10, a supporter 311 supports the light guide plate 220, and a shielding portion is not formed. Accordingly, light produced by the light emitting diode array 210 is directly incident on the light guide plate 220.

The light emitting diode array 210 includes a plurality of light emitting diodes 211, for example, a red light emitting diode Dr, a green light emitting diode Dg, and a blue light emitting diode Db depending on color. White light emitting diodes Dw are positioned at the beginning and the end of the light emitting diode array 210, respectively.

In the third exemplary embodiment, the white light emitting diodes Dw are positioned at the beginning and the end of the light emitting diode array 210, respectively, and the red, green, and blue light emitting diodes are positioned between the white light emitting diodes Dw in the order named.

The light emitting diode 211 includes a semiconductor 211a being a point light source and a lens 211b that refracts light emitted from the semiconductor 211a while covering the semiconductor 211a. A light emitting wavelength of the semiconductor 211a determines a color of the light emitting diode 211

The lens 211b may include a transparent material transmitting light, for example, synthetic resin such as polycarbonates and polymethylmethacrylate.

Because a driving current of the light emitting diode 211 changes depending on a color of the light emitting diode 211, as shown in FIG. 11, the light emitting diodes having the same color are connected in series to each other to constitute a circuit. More specifically, the red light emitting diodes Dr are connected in series to each other, the green light emitting diodes Dg are connected in series to each other, and the blue light emitting diodes Db are connected in series to each other.

In the third exemplary embodiment, the white light emitting diode Dw may use the blue light emitting diode Db as the semiconductor 211a, and the lens 211b of the white light emitting diode Dw, as shown in FIG. 12, may include a phosphor 211c producing yellow light obtained by mixing red light with green light.

In the third exemplary embodiment, because the white light emitting diode Dw uses the blue light emitting diode Db as the semiconductor 211a, the white light emitting diode Dw can be driven without a separate circuit for driving the white light emitting diode Dw by connecting the blue light emitting diode Db to the white light emitting diode Dw.

As describe above, because the white light emitting diode Dw is installed to face an edge portion of the light guide plate 220, a running phenomenon of a specific color at the edge portion of the light guide plate 220 can be prevented.

It will be apparent to those skilled in the art that various modifications and variations can be made in the present invention without departing from the spirit or scope of the invention. Thus, it is intended that embodiments of the invention cover the modifications and variations of this invention provided they come within the scope of the appended claims and their equivalents.

What is claimed is:

1. A LED backlight assembly comprising:
    a light emitting diode array including a plurality of red, green and blue light emitting diodes, the light emitting diode array having one of the red light emitting diodes positioned at an one end of the array and one of the blue light emitting diodes positioned at an another end of the array;
    a light guide plate at the side of the light emitting diode array; and
    a supporter supporting the light guide plate,
    wherein light from the light emitting diode array is incident into a side surface of the light guide plate,
    wherein an amount of red light produced and incident into the light guide plate by the red light emitting diode positioned at one end of the light emitting diode array is less than that by the next red light emitting diode, and wherein an amount of blue light produced and incident into the light guide plate by the blue light emitting diode positioned at another end of the light emitting diode array is less than that by the next blue light emitting diode.

2. The LED backlight assembly of claim 1, wherein the supporter includes:
    a frame fixing the light guide plate; and
    a shielding unit formed by a portion of the frame and facing the light emitting diodes positioned at the one and the another ends of the light emitting diode array.

3. The LED backlight assembly of claim 1, further comprising a shielding unit positioned between the light emitting diode array and the light guide plate that partially shields the red light emitting diode positioned at the one end of the light emitting diode array and the blue light emitting diode positioned at the another end of the light emitting diode array.

4. The LED backlight assembly of claim 1, wherein the amount of light produced by the red light emitting diode positioned at the one end of the light emitting diode array and the blue light emitting diode positioned at the another end of the light emitting diode array is less than the amount of light produced by the other light emitting diodes.

5. The LED backlight assembly of claim 4, wherein external surfaces of the red light emitting diode positioned at the one end of the light emitting diode array and the blue light emitting diode positioned at the another end of the light emitting diode array are haze-processed so as to emit light darker than light produced by the other light emitting diodes.

* * * * *